Nov. 6, 1928.  1,690,156
J. L. ARNOLD ET AL
DETACHABLE SIGN FOR AUTOMOBILES
Filed April 13, 1925
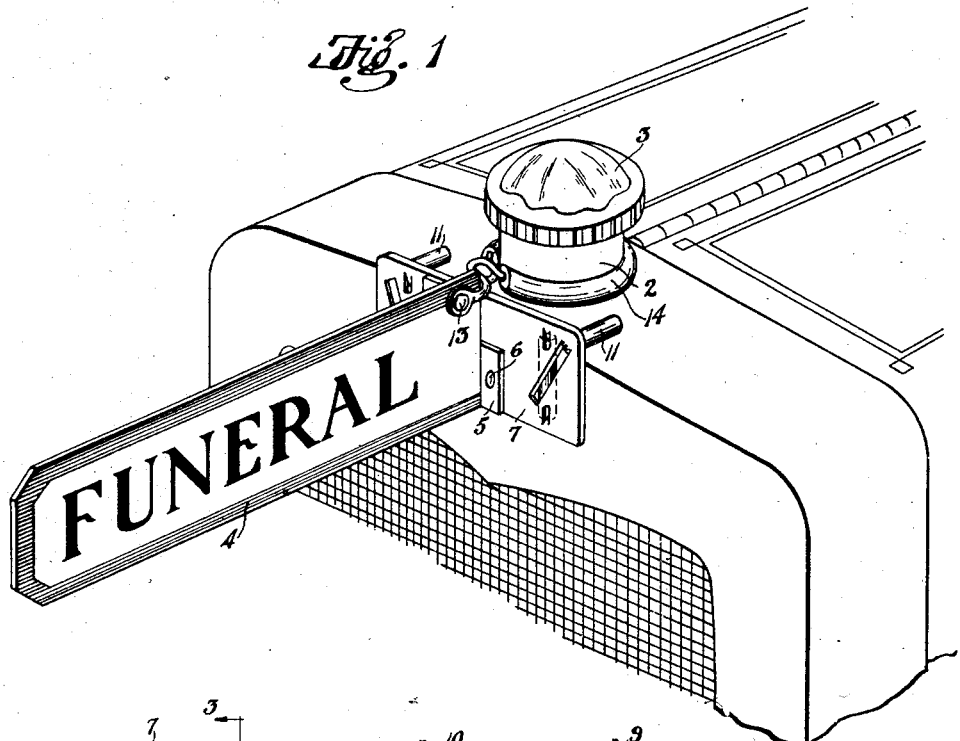
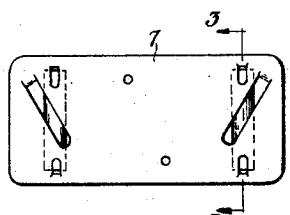
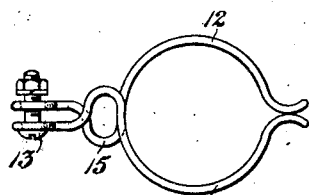
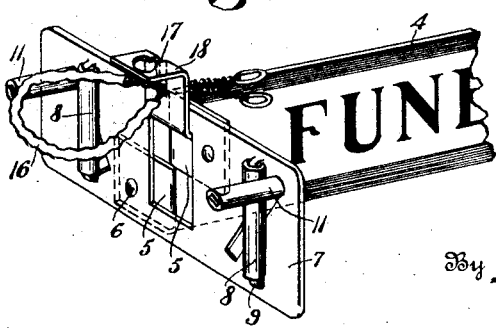
Inventor
John L. Arnold and
Herman A. Arnold
By Frease and Bond
Attorneys Patented Nov. 6, 1928.

1,690,156

UNITED STATES PATENT OFFICE.

JOHN L. ARNOLD AND HERMAN A. ARNOLD, OF CANTON, OHIO.

DETACHABLE SIGN FOR AUTOMOBILES.

Application filed April 13, 1925. Serial No. 22,629.

This invention relates to signs for use upon automobiles and the objects of the invention are to provide a sign which may be easily and readily attached to or detached from the radiator of an automobile and which will be held firmly and rigidly in position when attached.

The above and other objects may be attained by providing a back plate, to which a sign panel is connected, the back plate being arranged to contact with the front face of the automobile radiator and having a spring or flexible member for connection to the radiator cap or spout, fingers being provided upon the rear face of the back plate for engagement with the top of the radiator, whereby the sign panel is held against side movement.

An embodiment of the invention is illustrated in the accompanying drawing, in which—

Figure 1 is a perspective view of the improved sign, attached to the radiator of an automobile;

Fig. 2, a rear elevation of the back plate;

Fig. 3, a section on the line 3—3, Fig. 2;

Fig. 4, an end elevation of the back plate;

Fig. 5, a plan view of the attaching spring; and

Fig. 6, a rear perspective of a modified form of the invention showing a flexible chain for connecting the sign to the radiator spout.

Similar numerals of reference indicate corresponding parts throughout the drawing.

The present sign is adapted for use in any place where a detachable sign is required upon an automobile, but is especially designed for use upon funeral cars. Considerable trouble is caused to funeral directors by persons, especially automobile drivers, running between carriages in a funeral procession, and it frequently happens that the guilty persons claim they did not know that it was a funeral procession which they had interrupted.

With the present sign upon the radiator of each car in a funeral procession, such mistakes cannot be made, and as the sign is quickly and easily attached or detached, it will be seen that the funeral director may quickly place signs upon all cars when the funeral procession starts, and may easily remove the signs after the procession reaches the cemetery.

A portion of an automobile radiator is indicated at 1, and provided with the usual spout 2 and cap 3. The sign to which the invention pertains is in the form of a sheet metal panel 4, having the oppositely disposed attaching flanges 5 at its rear edge, connected as by the rivets 6 to the back plate 7.

For the purpose of preventing the radiator from being marred by the back plate, sections of rubber tubing 8, are fixed to the rear side of said plate, as by the tangs 9, struck out of the metal of the back plate.

Fingers 10 are punched from the back plate and extend rearwardly at right angles to the plate. These fingers are located near the upper corners of the plate and are covered with rubber or the like as shown at 11, to prevent marring of the top of the radiator.

In the form of the invention shown in Fig. 1, the sign is attached to the radiator cap or spout by means of a pair of curved spring fingers 12, connected to the sign panel as by a bolt 13, and preferably covered by rubber tubing 14, a reverse curve 15 being formed in each finger near the point of attachment to the sign. By pinching this portion of the spring together, the curved fingers will be separated to permit the same to slip over the radiator spout.

As shown in Fig. 6, the sign may be attached by means of a flexible chain 16 having its ends extended through a keyhole slot 17 located in an upright flange 18, formed from or attached to the back plate.

From the above it will be obvious that the sign is capable of being quickly attached to or detached from the radiator cap or spout, and when in position upon the car, is held firmly in place, the back plate and fingers 10 preventing side movement or twisting of the sign.

We claim:—

1. A detachable sign for automobiles including a back plate for engagement with the front of a radiator, fingers upon said back plate for engagement with the top of the radiator, flexible means for engagement with the radiator cap or spout and a sign panel located at right angles to the back plate and extending forwardly therefrom.

2. A detachable sign for automobiles including a back plate for engagement with the front of a radiator, fingers upon said back plate for engagement with the top of the radiator, spring means for engagement with the radiator cap or spout and a sign panel located at right angles to the back plate and extending forwardly therefrom.

3. A detachable sign for automobiles including a back plate for engagement with the front of a radiator, fingers upon said back plate for engagement with the top of the radiator, a pair of curved spring fingers for engagement with the radiator cap or spout and a sign panel located at right angles to the back plate and extending forwardly therefrom.

4. A detachable sign for automobiles including a back plate for engagement with the front of the radiator, means upon said back plate for engagement with the top of the radiator, flexible means for engagement with the radiator cap or spout and a sign panel located at right angles to the back plate and extending forwardly therefrorm.

In testimony that we claim the above, we have hereunto subscribed our names.

JOHN L. ARNOLD.
HERMAN A. ARNOLD.